United States Patent [19]

Friedrichs

[11] 4,347,672
[45] Sep. 7, 1982

[54] INFLOW BOTTOM FOR A FLUIDIZED BED REACTOR

[75] Inventor: Gregor Friedrichs, Pulheim, Fed. Rep. of Germany

[73] Assignees: Thyssengas GmbH, Duisburg; Didier Engineering GmbH, Essen, both of Fed. Rep. of Germany

[21] Appl. No.: 226,703

[22] Filed: Jan. 21, 1981

[30] Foreign Application Priority Data

Jan. 21, 1980 [DE] Fed. Rep. of Germany ....... 3001961

[51] Int. Cl.³ .............................................. F26B 17/10
[52] U.S. Cl. .................... 34/57 R; 34/57 A; 432/58
[58] Field of Search ...................... 34/57 R, 57 A, 10; 432/15, 58; 110/245; 239/288.5, 518

[56] References Cited

U.S. PATENT DOCUMENTS 3,746,516 7/1973 Michaud ............................. 34/57 A
3,896,560 7/1975 Knepper ............................. 34/57 R
3,995,771 12/1976 Olivier ............................... 34/57 A Primary Examiner—Larry I. Schwartz
Attorney, Agent, or Firm—Toren, McGeady & Stanger

[57] ABSTRACT

In a fluidized bed reactor an approach flow floor extends across below the suspension phase. Approach flow bodies are positioned in openings in the flow floor, each flow body has a pick-up pocket in its upper surface with a flow hole extending downwardly from the pocket to the lower end of the flow body. The upper end of the flow hole conically widens as it approaches the pocket. A distribution plate is located within the pocket spaced upwardly from the upper end of the flow hole. A baffle plate is positioned on the lower surface of the distribution plate spaced above the flow hole. The upper surface of the flow floor is inclined upwardly from the openings in which the flow bodies are positioned.

11 Claims, 2 Drawing Figures

INFLOW BOTTOM FOR A FLUIDIZED BED REACTOR

The invention concerns an approach flow floor for a fluidized bed reactor with approach flow nozzles in floor openings for feeding a charging gas into a fluidized bed above the approach flow floor.

A fluidized bed is usually produced by causing a carrier medium to undergo a pressure loss due to the flow resistance as it passes through fine-grained loose material, thereby exerting a force on the ballast. Fluidized beds are used in various chemical processes. Fluidized beds are particularly suitable for certain processes as they make possible good temperature control and continuous operation, are distinguished by good heat transfer and high reaction speed and guarantee steadily uniform contact activity in catalytic processes. However it has been found that the introduction of materials, in particular charging gases, into the fluidized bed, causes difficulties.

In fluidized bed technology, sieve floors are known in conjunction with which the charging gas is blown in from below through the sieve openings at a certain speed. When a fluidized bed is operated by means of a sieve floor, a flow-back of solid particles takes place, already after a brief period of operation, from the fluidized bed through the openings in the sieve floor. This causes a narrowing and blocking of the sieve openings and also unwanted and, consequently, intolerable premature catalytic reactions which finally necessitate taking the fluidized bed out of service.

From U.S. Pat. No. 3,896,560, an approach flow floor for a fluidized bed reactor is known, through the floor openings of which pipes extend, the upper part of which projects upwards to some extent out of the approach flow floor. The discharge openings of the pipes are covered with a plate at a distance from the upper end of the approach flow pipes to prevent solid particles dropping out of the fluidized bed from getting into the approach flow pipes. With this approach flow floor also, it is impossible to prevent solid particles from passing from the fluidized bed into the inside of the approach flow pipes and causing blockages and premature reactions, particularly as the internal cross-section of the approach flow pipes decreases considerably from top to bottom.

From the journal "Hydrocarbon Processing", Vol. 42, No. 6, 1963, pages 167 to 172, a further approach flow floor is known, in the openings of which gas distributors are disposed. These gas distributors consist of a housing in which two perforated plates, between which a filter insert of woven glass cloth of very fine mesh lies, are disposed at a slight vertical distance from each other. The distributor housings are located above the approach flow floor, so that solid particles which have dropped down out of the fluidized bed and settled on the approach flow floor between the housings can no longer get into the fluidized bed. In addition, hard solid particles which drop out of the fluidized bed and land on the upper perforated plate soon bore through the distributor surface and cause markedly exothermal reactions in the distributor. Moreover, with these distributors it is not possible to operate with gases capable of reaction.

The invention is based on the problem of providing an approach flow floor with which blockages are reliably excluded and consequently unwanted premature reactions do not occur.

This problem is solved in that, using an approach flow floor of the type mentioned at the outset, in accordance with the invention, approach flow bodies, each with a central approach flow hole, are disposed in the floor openings and a gas-permeable distributor plate is disposed on the approach flow body at a short distance above the discharge opening of the approach flow hole.

The relatively large-surfaced outflow of the charging gas results in a laminar flow of the gas flowing through the distributor plate and a largely homogeneous fluidized bed, whereby high relative speeds on the, for the most part, catalytically active solid particles are avoided. This causes a relatively slight abrasion of solid material. Moreover, the charging gas forms a uniform suspension phase with the fluidized bed, so that damaging local overheating in markedly exothermal reactions is avoided.

Moreover, due to the preferably identical direction of flow of the co-reactants on solid particles in the main reaction zone, the damaging effect of opposite directions of flow such as increased abrasion of solid material and local overheating are excluded.

The distribution plate consists preferably of porous material. It is also advisable to use distributor plates made of thermally insulating material. This prevents a transition of heat from the fluidized bed compartment into the approach flow bodies and eliminates damaging premature reactions, particularly as the charging gas flowing into the approach flow bodies has a cooling effect. It is also advantageous for the distributor plates to consist of catalytically inert material, in order to prevent unwanted premature reactions.

It is expedient that the distributor plates should have discharge openings 10 to 200 times the size of any possible impurities. This ensures that, even when the charging gas is polluted, no blockages occur on the correspondingly large-pore plate distributors and uniform reliability of operation is guaranteed. As pulsation surges can be prevented, inter alia, it is ensured that no solid particles will get into the approach flow holes of the approach flow bodies from the fluidized bed in any operational or stationary phase, thus excluding all danger of blockage.

A pick-up pocket for the distributor plate may be located in the upper part of the approach flow body. The approach flow hole can also open into the pick-up pocket via a conical widening.

To permit uniform distribution of the charging gas below the distributor plate, the latter can be elastically mounted on spaces disposed in the pick-up pocket. There may also be a packing between the side wall of the pick-up pocket and the distributor plate. This packing consists preferably of themally insulating material which should also be catalytically inert. To prevent the distributor plate from being lifted off the pick-up pocket by pressure acting from beneath, it is advisable to dispose a support for the distributor plate a very short distance above the distributor plate. To prevent the charging gas from flowing mainly through the median region of the distributor plate, a baffle plate can be disposed on the distributor plate above the conical widening. The approaching gas is hereby deflected out of the median region of the distributor plate. To prevent dead zones, wedge-shaped elevations can be disposed between the floor openings. For the same reason, it is advisable for the approach flow floor to display an upward incline between the reactor wall and the adjacent floor openings towards the reactor wall. This prevents dead zones in which no fluidization or suspension circulation occurs between the distributor plates and no clinkering of solid particles occurs.

Fault-free continuous operation of a fluidized bed is possible with the approach flow floor according to the invention and even repeated stationary phases cause no deteriorations.

The invention will now be described in detail with reference to an example of embodiment illustrated in the drawing.

Figure 1:
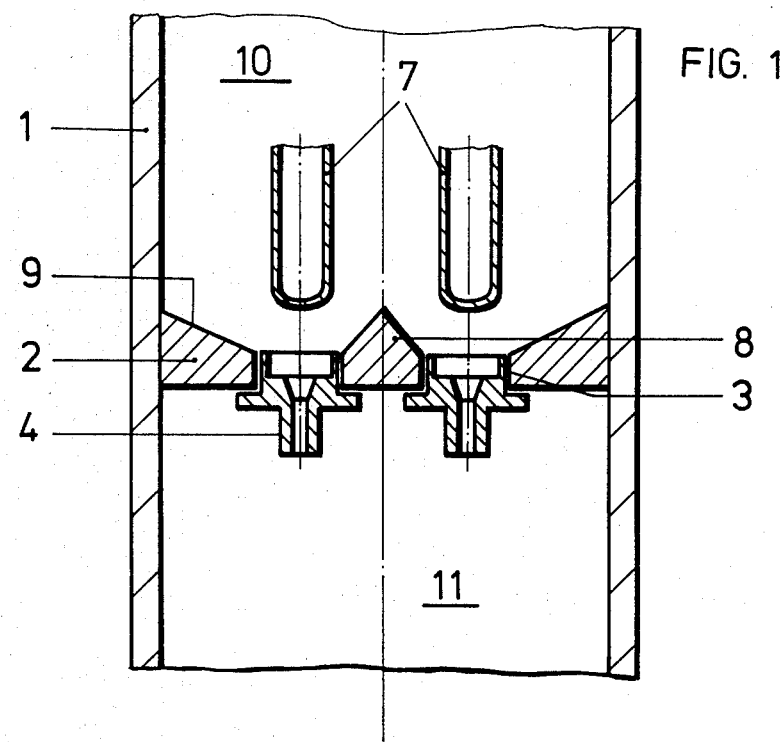
FIG. 1 shows a cross-section through an approach flow floor.
Figure 2:
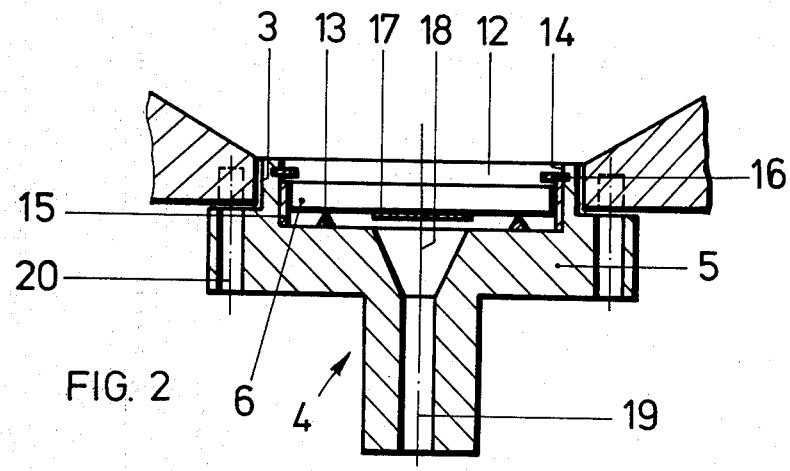
FIG. 2 shows an enlarged representation of a portion of FIG. 1.

An approach flow floor 2 with floor opening 3 is disposed in a fluidized bed reactor in which gas distributors 4 are located. The gas distributors 4 consist of an approach flow body 5 and a distributor plate 6. At a short distance above the approach flow floor 2, heat exchangers 7 are disposed for taking away the reaction heat generated by exothermal reactions. Between the gas distributors 4 are wedge-shaped elevations 8 of the approach flow floor 2. Moreover, the surfaces 9 of the approach flow floor 2 display an upward incline towards the reactor wall 1 between the distributor plates 6 and the reactor wall 1. Above the approach flow floor 2 there is the suspension phase 10 and, below the approach flow floor 2 the gas compartment 11.

A pick-up pocket 12 is worked into the upper region of the approach flow body 5 in which the distributor plate 6 is mounted on elastic spacers 13. A packing 15 of thermally insulating and catalytically inert material is disposed between the distributor plate 6 and the wall 14 of the approach flow body 5. A mounting support 16 which projects into the pick-up pocket 12 so far that the distributor plate 6 cannot involuntarily lift out of its position is located some distance above the packing 15.

Below the distributor plate 6, there extends a baffle plate 17 which is located at right angles above a conical widening 18 of an approach flow hole 19. One basic body 5 is secured from beneath to the approach flow floor 2 by means of screws in holes 20, not shown.

In a fluidized bed reactor of the type illustrated in the drawing, carbon gasification gases rich in carbon oxides are converted to a methane-rich gas, in which process the following main reactions take place releasing substantial quantities of heat:

| | | |
|---|---|---|
| (I) | $CO + 3H_2$ | $CH_4 + H_2O$ |
| (II) | $CO + H_2O$ | $CO_2 + H_2$ |
| (III) | $CO_2 + 4H_2$ | $CH_4 + 2H_2O$ |
| (IV) | $2CO$ | $C + CO_2$ |

While the fluidized bed reactor is in operation, the gasification gas passes out of the gas chamber 11 through the approach flow holes 19 of the gas distributors 4 into the conical widening 18 and from here, after deflection from the baffle boards 17 through the distributor plates 6 into the reaction chamber 10 above the approach flow floor 2 in which the fluidized bed is located.

The wedge-shaped elevations 8 and the sloping surfaces 9 of the approach flow floor 2 ensure that solid particles dropping out of the fluidized bed slide down to the distributor plates 6 and are carried back from here into the suspension phase 10 again.

The claims defining the invention are as follows:

1. Approach flow floor for a fluidized bed reactor for flowing a feed gas upwardly through a fluidized bed in the reactor with the approach flow floor extending transversely across the direction of gas flow, said flow floor having a number of laterally spaced openings therethrough, an approach flow body located within each of the openings in said flow floor, each said approach flow body having a lower end and an upper end, said approach flow body forming a pick-up pocket within and extending downwardly from the upper end of said flow body, a flow hole extending upwardly from the lower end of said flow body in said pick-up pocket so that the upper end of said flow hole is spaced below the upper end of said flow body, said flow hole has a widening part at the upper end thereof opening into said pick-up pocket, a distribution plate located within said pick-up pocket and spaced upwardly from the upper end of said flow hole, said pick-up pocket has a greater transverse cross-sectional area than the upper end of said flow hole and said distribution plate extends across said pick-up pocket transversely of the upward direction, a gas impermeable baffle plate on the underside of said distribution plate and aligned above the widened part of said flow hole, and the upper surface of said flow floor sloping upwardly from the edges of the openings therethrough in which said approach flow bodies are located.

2. Approach flow floor as in claim 1, characterized in that the distributor plate (6) is made of porous material.

3. Approach flow floor as in claim 1, characterized in that the distributor plate (6) is made of thermally insulating material.

4. Approach flow floor as in claim 1, characterized in that the distribution plate (6) is made of catalytically inert material.

5. Approach flow floor as in claim 1, characterized in that the distributor plate (6) has approach flow openings 10 to 200 times the size of possible impurities.

6. Approach flow floor as in claim 1, characterized in that elastic spacers (13) mount the distributor plate (6) in the pick-up pocket (12) and space the distributor plate upwardly from the upper end of said flow hole.

7. Approach flow floor as in claim 1, characterized in that said pick-up pocket (12) has upwardly extending side walls laterally defining said pocket, a packing (15) is disposed between the side wall (14) of the pick-up pocket (12) and the peripheral edges of said distributor plate (6).

8. Approach flow floor as in claim 7, characterized in that the lateral packing (15) is made of thermally insulating material.

9. Approach flow floor as in claim 7 or 8, characterized in that the lateral packing (15) is made of catalytically inert material.

10. Approach flow floor as in claim 1, characterized in that a mounting support (16) for the distributor plate (6) is disposed in said pick-up pocket (12) at a distance above the distributor plate (6).

11. Approach flow floor as in claim 1, characterized in that wedge-shaped elevations (8) are disposed on the upper surface of said approach flow floor (2) between the floor openings (3) and form at least a part of the upwardly sloping surfaces therein.

* * * * *